United States Patent [19]

Ruch et al.

[11] Patent Number: 5,724,226
[45] Date of Patent: Mar. 3, 1998

[54] HOUSING ACCESS DOOR CONSTRUCTION FOR A PORTABLE COMPUTER DOCKING STATION

[75] Inventors: Mark H. Ruch, The Woodlands; Kelly K. Smith, Spring, both of Tex.

[73] Assignee: Compaq Computer Corporation, Houston, Tex.

[21] Appl. No.: 664,421

[22] Filed: Jun. 14, 1996

[51] Int. Cl.$^6$ .................... G06F 1/16; H05K 5/03
[52] U.S. Cl. .................... 361/683; 220/335; 220/341; 361/724
[58] Field of Search .................... 220/335, 341, 220/337, 345, 346, 348; 312/223.1, 223.2, 223.3, 327, 328; 49/463; 361/683, 686, 684, 685, 724–727; 364/708.1

[56] References Cited

U.S. PATENT DOCUMENTS

| | | | |
|---|---|---|---|
| 5,076,429 | 12/1991 | Patrick et al. | 206/370 |
| 5,076,461 | 12/1991 | Nichols | 220/352 |
| 5,255,965 | 10/1993 | Chen et al. | 312/7.1 |
| 5,433,319 | 7/1995 | Tang | 206/308.1 |
| 5,542,757 | 8/1996 | Chang | 312/223.2 |
| 5,574,625 | 11/1996 | Ohgami et al. | 361/684 |

*Primary Examiner*—Lynn D. Feild
*Attorney, Agent, or Firm*—Konneker & Smith, P.C.

[57] ABSTRACT

The housing of a portable computer docking station has an exterior wall with an opening formed therein through which a PC card may be inwardly passed for operative insertion into a PC card ejection mechanism disposed within the housing in a facing, inwardly spaced relationship with the exterior wall opening. A molded plastic access door member has a pair of outwardly projecting pin portions which are releasably snap fitted into socket structures formed on interior housing mounting walls to thereby support the door for pivotal movement between closed and open positions in which the door respectively blocks and unblocks the exterior wall opening. Complementarily sloped surfaces on the pins and the sockets are engageable in a manner resiliently deforming the door as it approaches either of its closed and open positions and then permitting the door to return to its original shape. As it returns to its original shape the door automatically drives itself through a final distance to its closed or open position as the case may be. The engageable sloped surfaces on the pins and socket structures, together with interengageable detent structures on the pins and sockets, function to releasably hold the door in its closed or open position. In this manner the door itself is used as an opening and closing spring, thereby eliminating the need for a separate spring member.

34 Claims, 3 Drawing Sheets

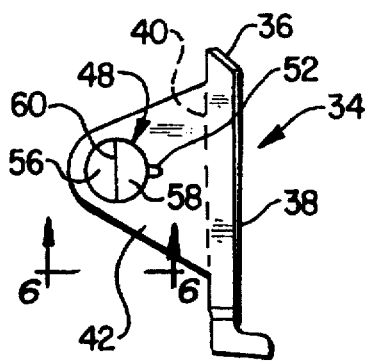
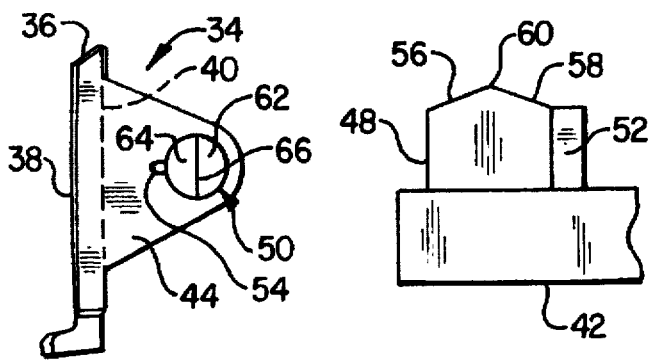
FIG. 4  FIG. 5  FIG. 6
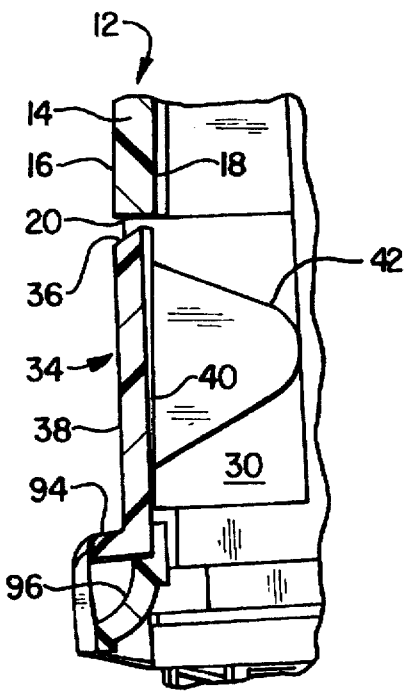
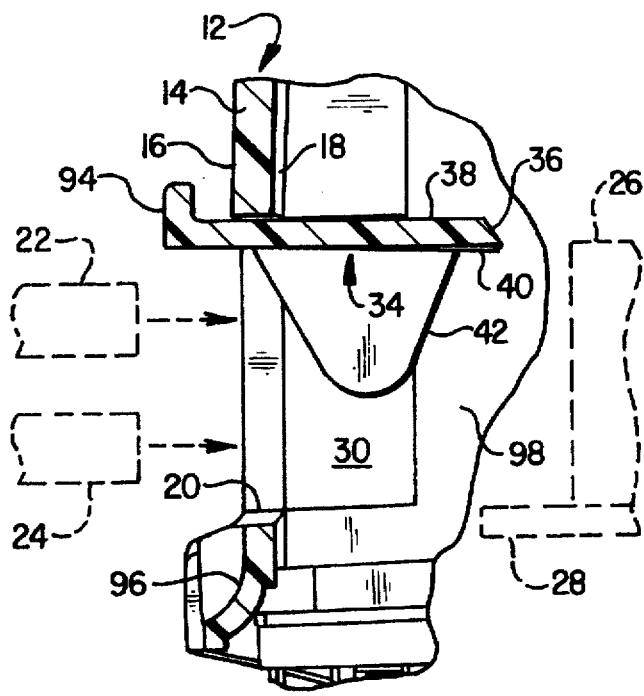
FIG. 7  FIG. 8

HOUSING ACCESS DOOR CONSTRUCTION FOR A PORTABLE COMPUTER DOCKING STATION

BACKGROUND OF THE INVENTION

1. Field of the Invention

The present invention generally relates to access door structures mountable at a wall opening to selectively provide and block access through the opening from an area on one side of the wall to an area on the opposite side of the wall and, in a preferred embodiment of the invention, more particularly relates to a specially designed pivotal access door mountable on an opening in an exterior housing wall portion of a computer device such as, for example, a portable computer docking station.

2. Description of Related Art

Various electronic devices, such as computers, computer docking stations and printers, include housing structures through an outer wall section of which it is desirable to conveniently gain access to the interior of the housing without disassembling the housing. One of many examples of this ready access requirement is in applications where a PC card eject mechanism is disposed within the housing interior and is operative to removably receive a PC card and couple the card to various electronic circuitry within the housing. The PC card may be, for example, a memory card, a fax modem card, a hard drive card, or a network card.

To provide PC card access to the associated PC card eject mechanism within the housing, an opening through which a PC card may be inserted into and removed from the housing interior is formed in an exterior housing wall in suitable alignment with the card-receiving portion of the bus structure. In order to cover the housing wall opening prior to the operative connection of a PC card to the associated eject mechanism, and after the removal of the card therefrom, it is common practice to support some type of access door structure on the housing wall at the card-receiving opening therein.

Various types of access door structures have previously been utilized in this and similar types of applications including (1) spring-loaded shutter type doors pivotally secured to a peripheral housing edge portion around the access and swingable into the housing interior; (2) removable bezel type doors that onto the housing wall to cover the access opening and snap off the housing wall to expose the access opening; and (3) access doors mounted on the housing wall for sliding movement relative and parallel thereto between open and closed orientations.

While these conventional types of access doors are generally suited to their intended purpose, they are subject to a variety of well known problems, limitations and disadvantages. For example, the spring-loaded shutter type of access door is relatively complicated to fabricate and install, requiring as it does a separate spring member and oftentimes one or more additional mounting parts to properly support the access door itself. The bezel type access door can be awkward to use, and, since it is physically separable from the housing, can be easily lost or misplaced. Like the spring-loaded shutter type door, the sliding access door can present fabrication complexities and multiple parts.

Additionally, both the spring-loaded shutter type door and the sliding door (when mounted on the inner side of the housing wall over the access opening) must necessarily encroach on the area between the inner side of the housing wall portion in which the access opening is formed and the card-receiving eject mechanism. This encroachment undesirably prevents or at least inhibits the placement of a security blocking device between the eject mechanism and the access opening.

In view of the foregoing it can readily be seen that a need exists for an improved access door structure, positionable at an access opening in a housing or other type wall, that eliminates or at least substantially reduces the above mentioned problems, limitations and disadvantages commonly associated with conventional access door structures of the types generally described above. It is accordingly an object of the present invention to provide such an improved access door structure.

SUMMARY OF THE INVENTION

In carrying out principles of the present invention, in accordance with a preferred embodiment thereof, a computer apparatus, representatively a portable computer docking station, is provided that includes a housing having a housing with an exterior wall with an opening therein positioned and configured to provide access to a computer component, such as a PC card eject mechanism, disposed within the housing.

The apparatus further comprises a door member, and mounting structure supporting the door member for pivotal movement, about a pivot axis, relative to the exterior wall between a closed position in which the door member blocks the opening, and an open position in which the door member unblocks the opening.

The door member and the mounting structure have cooperatively engageable surfaces operative during pivotal movement of the door member toward one of its open and closed positions to resiliently deform the door member and then permit the resiliently deformed door member to return to its original shape in a manner driving itself a final distance to such one of its open and closed positions. The cooperatively engageable surfaces are also operative to releasably hold the door member in such one of its open and closed positions.

Representatively, the door member is formed as a one piece resilient plastic molding having a generally flat body portion with transverse mounting flanges at opposite end portions thereof. Each mounting flange has an outwardly projecting transverse mounting pin portion with a sloping side surface at its outer end. The pins are rotatably received within socket recesses formed in internal housing mounting walls, with the socket recesses having nonparallel sloped inner end surfaces.

As the door is manually moved toward one of its open and closed positions, the interengageable sloping pin and socket surfaces cooperate to bend the door body and create therein a resilient spring force biasing the door body toward its original nondeformed configuration. As the door body approaches its final position the sloping socket and pin surfaces permit the door body to unbend in a manner causing the unbending door body to pivotally drive the door a final distance to its final position. Detent projections on the pins snap into place in corresponding mounting wall recesses as the door reaches its final position to assist in releasably holding the door therein.

BRIEF DESCRIPTION OF THE DRAWINGS

FIG. 4 is an enlarged scale left end elevational view of the access door taken along line 4—4 in FIG. 1;

FIG. 5 is an enlarged scale right end elevational view of the access door taken along line 5—5 in FIG. 1;

FIG. 6 is an enlarged scale side elevational view of a specially configured mounting pin portion of the access door taken along line 6—6 of FIG. 4;

FIG. 7 is an enlarged scale cross-sectional view taken through a portion of the docking station along line 7—7 of FIG. 2;

FIG. 8 is an enlarged scale cross-sectional view taken through a portion of the docking station along line 8—8 of FIG. 3;

DETAILED DESCRIPTION

Figure 3:
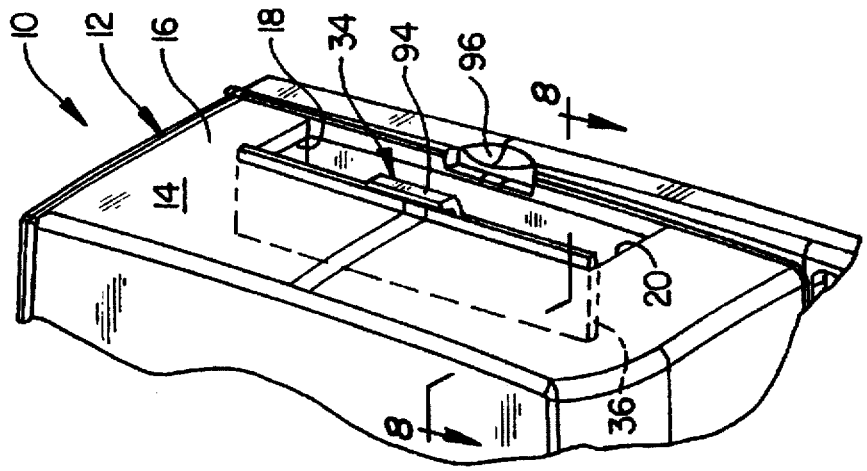
FIG. 3 is a perspective view similar to that in FIG. 2, but with the access door pivoted upwardly to its open position.
Figure 2:
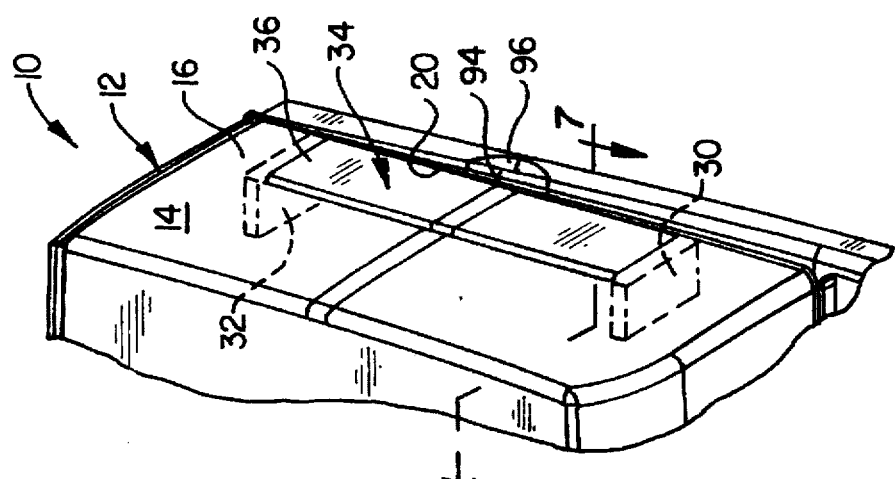
FIG. 2 is a perspective view similar to that in FIG. 1, but with the access door installed and pivoted downwardly to its closed position.

Referring initially to FIGS. 1–3 and 8, the present invention provides a computer apparatus 10 which is representatively a portable computer docking station having a housing 12, only a corner portion of which is illustrated. Housing 12 has an upstanding exterior wall 14 with outer and inner side surfaces 16 and 18. A horizontally elongated rectangular access opening 20 is formed in the exterior wall 14 and, as shown in FIG. 8 in simplified form, is configured to permit insertion therethrough of a pair of PC cards 22,24 for removable coupling to a facing interior PC card eject mechanism 26 interiorly disposed within the housing 12 atop a system I/O board 28.

Housing 12 is formed from a suitable molded plastic material. For purposes subsequently described herein, left and right vertically oriented interior mounting walls 30 and 32 extend transversely from the housing wall 14 into the interior of the housing 12 respectively from adjacent the horizontally spaced apart left and right ends of the access opening 20.

With general reference now to FIGS. 1–8, the housing 12 is provided with a specially designed access door 34 which is removably attachable to the housing 12 and used to selectively cover and uncover the access opening 20. Access door 34 is representatively formed as a one piece resilient plastic molding, preferably from a suitable polycarbonate/ABS material blend, and includes a flat, horizontally elongated rectangular body portion 36 with inner and outer sides 38 and 40. A pair of generally triangularly shaped mounting flange sections 42 and 44 respectively project transversely inwardly from left end right ends of the body portion 36.

In a manner subsequently described herein, the access door 34 is pivotable about a horizontally extending pivot axis 46 (see FIG. 1) passing transversely through the apex portions of the triangularly shaped mounting flanges 42 and 44. Respectively projecting outwardly from the outer sides of the flanges 42,44 are a pair of cylindrical mounting pins 48,50 (see FIGS. 4–6) which are coaxial with and spaced apart along the pivot axis 46. Detent projections 52,54 are respectively formed on the sides of the pins 48,50 and project toward the inner side 40 of the access door body portion 36.

For purposes later described herein, the outer end of the pin 48 (see FIGS. 4 and 6) has a crowned configuration defined by opposed axially outwardly and laterally inwardly sloped side surface portions 56,58 that meet at a ridge edge 60 at the outer end of the pin 48. Sloped side surface portion 58 faces the inner side 40 of the access door body portion 36. In a similar fashion the outer end of the pin 50 (see FIG. 5) has a crowned configuration defined by opposed axially outwardly and laterally inwardly sloped side surface portions 62,64 that meet at a ridge edge 66 at the outer end of the pin 50. Ridge edges 60,66 are generally parallel to one another and parallel to the plane of the inner side 40 of the access door body portion 36.

Turning now to FIGS. 9–12, the access door 34 is operatively supported at the exterior housing wall opening 20 by a mounting structure that includes cylindrical socket recesses 68,70 respectively formed in the facing side surfaces of the left and right interior mounting walls 30 and 32. Socket recesses 68,70 are coaxial with one another and respectively have nonparallel sloping inner end surfaces 72 and 74.

Figure 1:
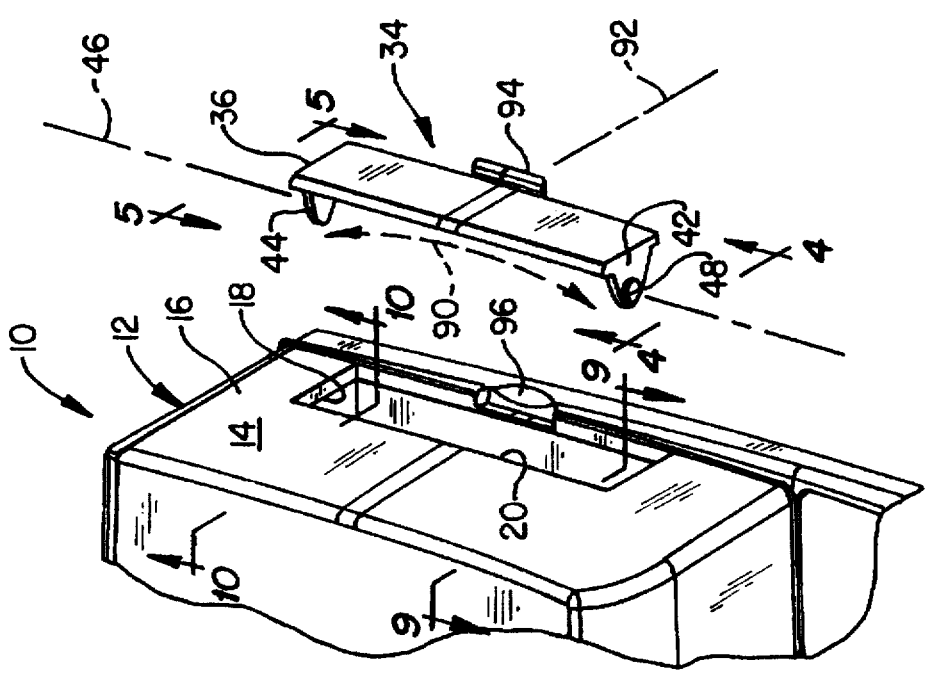
FIG. 1 is a partially exploded perspective view of a portion of a portable computer docking station having a specially designed card bus access door embodying principles of the present invention and being shown removed from the housing portion of the docking station for illustrative purposes.
Figure 9:
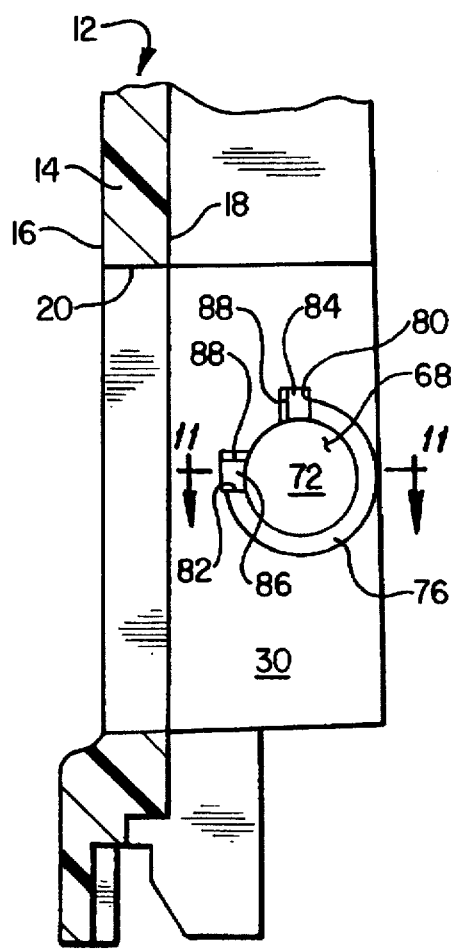
FIG. 9 is an enlarged scale cross-sectional view taken through a portion of the docking station along line 9—9 of FIG. 1.

Socket inner end surface 72 is positioned inwardly adjacent the left end of the access opening 20 as viewed in FIG. 1 and is sloped outwardly and to the left relative to the access opening 20 as viewed in FIG. 1. The opposite socket inner end surface 74 is positioned inwardly adjacent the right end of the access opening 20 as viewed in FIG. 1 and is sloped downwardly and to the left as viewed in FIG. 1.

The outer ends of the socket recesses 68 and 70 are partially circumscribed by raised rib projections 76,78 respectively formed on the facing side surfaces of the mounting walls 30,32 and extending through 270° arcs. Each of the ribs 76,78 has, at it opposite ends, a pair of stop surfaces 80 and 82. Stop surfaces 80,82 are respectively adjacent detent recesses 84,86 formed in the facing sides of the mounting walls 30 and 32 and having radiused side edge portions 88.

Access door 34 may be quickly and easily installed on the interior mounting walls 30,32 by simply snap-fitting the pins 48,50 into their associated socket openings 72,74. This is accomplished by slightly bending the access door body portion 36, as indicated by the double-ended dashed arrow 90 in FIG. 1, about an axis 92 transverse to the pivot axis 46, respectively aligning the pins 48,50 with the sockets 72 and 74, and then releasing the body portion 36 to allow the pins to pop into the sockets.

This removably supports the access door 34 on the mounting walls 30,32 for pivotal movement relative to the housing 12, about the pivot axis 46, between a closed position (see FIGS. 2 and 7) in which the door body portion 34 is vertically oriented at an outer side of the wall opening 20 and blocks the opening 20, and a closed position (see FIGS. 3 and 8) in which the door body portion 34 extends horizontally inwardly through a small top side portion of the opening 20 and substantially unblocks the opening 20.

To facilitate the manual movement of the access door 36 between its illustrated closed and open positions, an outwardly projecting finger portion 94 (that may be manually grasped) is formed along a central bottom side portion of the door body portion 36. With the access door 34 in its closed position, the projecting portion 94 overlies a corresponding access recess 96 formed on an exterior side portion of the housing 12 below a horizontally central portion of the access opening 20.

In addition to being of a relatively inexpensive construction, and quite easily installed, the access door has another advantage over conventional access doors used at exterior housing openings in, other types of electronic apparatus and computer devices. As may be seen by comparing FIGS. 7 and 8, the door 34 of the present invention may be pivotally moved between its FIG. 7 closed position and its FIG. 8 open position without substantially encroaching on the interior housing space 98 (see FIG. 8) between the wall opening 20 and the PC card eject mechanism 26 (or other type of computer component) behind the opening 20. This permits, if desired, the selective placement of a security blocking device (not shown) between the opening 20 and the PC card eject mechanism 26 to block access thereto.

According to another feature of the invention, cooperating portions of the door 34 and its previously described mounting structure are operative, without the use of separate spring members or other additional parts, to resiliently drive the door 34 to either its closed or open position and releasably retain the door in such position. As will now be described, these operational features are achieved by automatically imparting to the door a resilient internal spring force as it is moved from either of its closed or open position toward the other position, and then causing the door to release its internal spring force, as it approaches its new position, in a manner causing the door to drive itself a final distance to its new position and releasably retain itself therein when it reaches the new position.

When the access door 34 is in, for example, its closed position (see FIG. 7) the sloping end surface 56 of its left mounting pin 48 (see FIGS. 4 and 6) is parallel to and slidably engages the sloping inner end surface 72 (see FIGS. 9 and 11) of the left socket recess 68. At the other end of the door 34, the ridge edge 66 (see FIG. 5) slidably engages the sloping inner end surface 74 of the right socket recess 70 (see FIGS. 10 and 12). The pin member detent projections 52,54 (see FIGS. 4 and 5) are respectively received in the detent recesses 86 and 88, and the access door 34 is in a substantially undeformed state.

As the access door 34 is manually pivoted away from its FIG. 7 closed position toward its FIG. 8 open position, the sloping left pin end surface 56 is rotated out of its parallel relationship with the inner socket end surface 72 to cause the left ridge edge 60 to slidably bear against the sloping inner socket end surface 72. The sliding engagement of both the ridge edges 60,66 with their associated sloping socket recess inner end surfaces 72,74 axially forces the left mounting pin 48 toward the right mounting pin 50 as the pin detent projections 52,54 slide along the radiused edge portions 88 of their associated detent recesses 86,88 while exiting such recesses. The forcing of the mounting pins 48,50 axially closer together creates a resilient bending of the door body portion 36, as indicated by the dashed double-ended arrow 90 in FIG. 1, about the axis 92, thereby creating in the door body portion 36 an internal resilient spring force biasing it back toward its original undeformed configuration.

Figure 10:
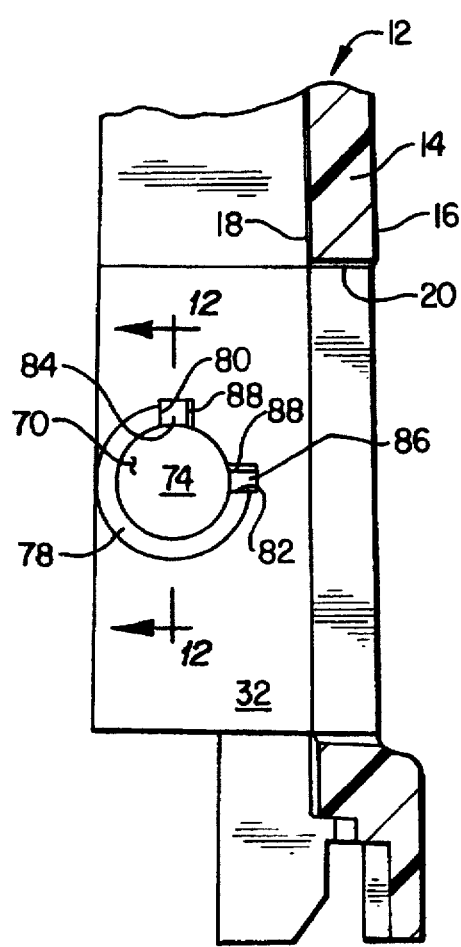
FIG. 10 is an enlarged scale cross-sectional view taken through a portion of the docking station along line 10—10 of FIG. 1.
Figure 11:
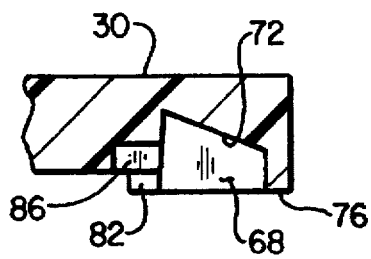
FIG. 11 is an enlarged scale cross-sectional view taken through a mounting wall portion of the docking station along line 11—11 of FIG. 9.
Figure 12:
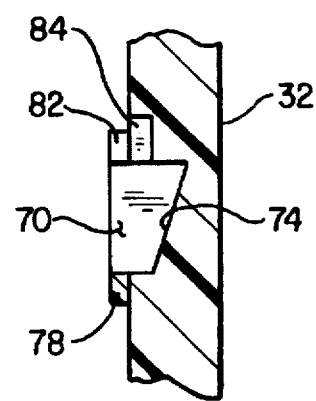
FIG. 12 is an enlarged scale cross-sectional view taken through a mounting wall portion of the docking station along line 12—12 of FIG. 10.

As the now resiliently deformed access door 34 pivotally approaches its FIG. 8 open position, and the detent projections 52,54 approach their associated upper detent recesses 84, the sloping outer pin end surface 62 (see FIG. 5) begins to be brought into a parallel relationship with its associated sloping inner socket end surface 74 (see FIGS. 10 and 12). This permits the internal spring energy in the resiliently deformed access door 34 to increase the distance between the pins 48,50 and begin to return the door to its original undeformed configuration. As this occurs, and the pin surface 62 approaches a parallel, contacting relationship with the socket end surface 74, a sliding interengagement between the pin and socket surfaces 62,74 causes the access door 34 to pivotally drive itself the remaining distance to its FIG. 8 open orientation at which time the detent projections 52,54 pop into the upper detent recesses 84 to thereby releasably retain the access door 34 in its FIG. 8 open position.

When it is later desired to close the access door 34 a reverse sequence is initiated. Specifically, as the door 34 is manually pivoted away from its FIG. 8 open position toward its FIG. 7 closed position the pin end surface 62 is pivoted away from its parallel sliding relationship with the socket end surface 74 to cause the ridge edge 66 to slidably engage the socket surface 74 (while the other ridge edge 60 slidably engages its associated socket surface 72) and correspondingly shorten the axial distance between the pins 48,50 and resiliently bend the door body portion 36 as the detent projections 52,54 exit their associated detent recesses 84. When the resiliently deformed door 34 approaches its FIG. 7 closed position the sloping pin surface 56 begins to come into a parallel relationship with its associated socket surface 72, thereby permit the door to resiliently drive the pin 48 further away from the pin 50 and pivotally drive itself to its FIG. 7 closed position as the detent projections 52,54 releasably snap into their associated detent recesses 86. The stop surfaces 80,82 on the raised ribs 76,78 cooperate with the detent projections 52,54 to limit the overall pivotal movement of the access door 34 to between its illustrated closed and open positions.

As can be seen, this unique interengagement between portions of the resiliently deformable one piece molded plastic access door 34 and its associated mounting structure permits the door to resiliently drive itself final distances to its open and closed positions, without the use of separate spring members or other loose components, and then releasably retain itself in either position. Moreover, the access door 34 may be quickly and easily installed by simply bending it and releasably snapping it into place on its associated mounting structure. And, as previously mentioned, the movement of the door 34 between its open and closed positions is achieved without the door substantially encroaching on the space 98 (see FIG. 8) between the access opening 20 and the PC card eject mechanism 26.

The foregoing detailed description is to be clearly understood as being given by way of illustration and example only, the spirit and scope of the present invention being limited solely by the appended claims.

What is claimed is:

1. Apparatus comprising:

a wall with an opening formed therein;

a door member having a main body portion with spaced apart mounting structures thereon, said main body portion being supported by said mounting structures for movement relative to said wall between first and second positions to cause said main body portion to respectively block and unblock said opening; and means for engaging said mounting structures in a manner resiliently altering the configuration of said main body portion of said door member, to create an internal spring force therein, while said main body portion of said door member approaches one of said first and second positions, and then releasing said internal spring force in a manner causing said main body portion of said door member to drive itself a final distance to said one of said first and second positions.

2. The apparatus of claim 1 wherein said apparatus is an electronic device.

3. The apparatus of claim 2 wherein said electronic device is a computer device.

4. The apparatus of claim 3 wherein said computer device is a computer docking station.

5. The apparatus of claim 1 wherein:
   said apparatus further comprises a housing, and
   said wall is an exterior wall of said housing.

6. The apparatus of claim 1 wherein said main body portion of said door member is supported for pivotal movement relative to said wall between said first and second positions.

7. The apparatus of claim 1 wherein said means are further operative to releasably hold said door member in said one of said first and second positions.

8. Apparatus for providing access from an area on one side of a wall to an area on the opposite side of the wall, said apparatus comprising:
   an opening formed in the wall;
   a door member having first and second spaced apart locations thereon; and
   a mounting structure for supporting said door member, at said first and second spaced apart locations thereon, for movement relative to the wall between a closed position in which said door member blocks said opening, and an open position in which said door member unblocks said opening,
   said first and second door member locations and said mounting structure having cooperatively engageable portions operative to resiliently deform said door member along a distance thereon extending from said first location to said second location during movement of said door member through an initial distance toward one of said open and closed positions thereof, and then permit said door member to return to its original shape in a manner causing said door member to drive itself the rest of the way to said one of said open and closed positions thereof.

9. The apparatus of claim 8 wherein said mounting structure is operative to support said door member for pivotal movement relative to the wall, about a pivot axis, between said open and closed positions.

10. The apparatus of claim 9 wherein said cooperatively engageable portions are operative to resiliently bend said door member about an axis transverse to said pivot axis when said door member is positioned between said open and closed positions thereof.

11. The apparatus of claim 8 wherein said cooperatively engageable portions are slidably interengageable surface portions of said door member and said mounting structure.

12. The apparatus of claim 8 wherein said cooperatively engageable portions, in response to said door member reaching said one of said open and closed positions thereof, are further operative to releasably restrain said door member against movement away from said one of said open and closed positions thereof.

13. An access door securable to a mounting structure adjacent a wall opening for movement relative to the wall between closed and open positions in which said access door respectively blocks and unblocks the wall opening, said access door comprising:
   a body portion; and
   a spaced pair of mounting portions carried by said body portion and being movably securable to the mounting structure,
      said mounting portions being configured to cooperatively engage the mounting structure in a manner resiliently deforming said access door between said mounting portions as said access door approaches one of said closed and open positions and then permitting said access door to return to its original shape and, by doing so, cause said access door to drive itself through a final distance to said one of said closed and open positions thereof.

14. The access door of claim 13 wherein said access door is a one piece resilient plastic molding.

15. The access door of claim 14 wherein said access door is formed from a polycarbonate/ABS material blend.

16. An access door securable to a mounting structure adjacent a wall opening for movement relative to the wall between closed and open positions in which said access door respectively blocks and unblocks the wall opening, said access door comprising:
   a body portion; and
   a spaced pair of mounting portions carried by said body portion and being movably securable to the mounting structure,
      said mounting portions being configured to cooperatively engage the mounting structure in a manner resiliently deforming said access door as it approaches one of said closed and open positions and then permitting said access door to return to its original shape and, by doing so, cause said access door to drive itself through a final distance to said one of said closed and open positions thereof,
      said access door being pivotable about a pivot axis, and
      said spaced pair of mounting portions including a pair of oppositely extending mounting pin structures spaced apart along the pivot axis, each of said mounting pin structures having, at its outer end, a first axially outwardly and laterally inwardly sloped exterior side surface portion.

17. The access door of claim 16 wherein each of said mounting pin structures further has, at its outer end, a second axially outwardly and laterally inwardly sloped exterior side surface portion that opposes the first exterior side surface portion and meets it at an outer end edge portion of the mounting pin structure.

18. The access door of claim 17 wherein said outer end edges of said mounting pin structures are generally parallel with one another.

19. The access door of claim 16 wherein each of said mounting pin structures has a transversely outwardly projecting detent portion positioned axially inwardly of its first exterior side surface portion.

20. The access door of claim 16 wherein:
   said body portion has a spaced pair of opposite end edge portions from which a pair of mounting flanges transversely project in the same direction, and
   said mounting pin projections are transversely carried on said mounting flanges.

21. The access door of claim 20 wherein:

said body portion has a spaced pair of opposite side edge portions extending between said spaced pair of opposite end edge portions, and said mounting pin projections are spaced apart from said body portion and positioned intermediate said opposite side edge portions.

22. Computer apparatus comprising:

a housing having a computer component therein, an exterior wall, and an opening formed in said exterior wall and providing access to said computer component;

a door member; and mounting structure supporting said door member for pivotal movement, about a pivot axis, relative to said exterior wall between a closed position in which said door member blocks said opening, and an open position in which said door member unblocks said access opening, said door member and said mounting structure having cooperatively engageable surfaces at spaced apart first and second locations on said door member operative during pivotal movement of said door member toward one of said open and closed positions thereof to resiliently deform said door member between said spaced apart first and second locations thereon and then permit the resiliently deformed door member to return to its original shape in a manner driving itself a final distance to said one of said open and closed positions thereof.

23. The computer apparatus of claim 22 wherein:

said computer component is a PC card eject mechanism, and said opening is configured to permit insertion therethrough of a card device connectable to said PC card eject mechanism.

24. The computer apparatus of claim 23 wherein said computer apparatus is a portable computer docking station.

25. The computer apparatus of claim 22 wherein said door member is releasably snap-fittable into said mounting structure.

26. The computer apparatus of claim 22 wherein said door member is of a one piece molded plastic construction.

27. The computer apparatus of claim 22 wherein said cooperatively engageable surfaces are further operative to releasably hold said door member in said one of said closed and open positions thereof.

28. Computer apparatus comprising:

a housing having a computer component therein, an exterior wall, and an opening formed in said exterior wall and providing access to said computer component;

a door member; and mounting structure supporting said door member for pivotal movement, about a pivot axis, relative to said exterior wall between a closed position in which said door member blocks said opening, and an open position in which said door member unblocks said access opening, said door member and said mounting structure having cooperatively engageable surfaces operative during pivotal movement of said door member toward one of said open and closed positions thereof to resiliently deform said door member and then permit the resiliently deformed door member to return to its original shape in a manner driving itself a final distance to said one of said open and closed positions thereof, said mounting structure including a pair of mounting socket structures coaxial with and spaced apart along said pivot axis, and having nonparallel inner end surfaces, and said door member having oppositely projecting mounting pin structures rotatably received in said mounting socket structures, said mounting pin structures having on outer ends thereof axially outwardly and laterally inwardly sloped side surface portions that define with said inner end surfaces of said mounting socket structures said cooperatively engageable surfaces.

29. The computer apparatus of claim 28 wherein:

said door member has a body portion with spaced apart opposite end edge portions from which a pair of mounting flanges transversely project from said body portion in the same direction, and said mounting pin structures are spaced apart from said body portion and transversely project outwardly from said mounting flanges.

30. The computer apparatus of claim 29 wherein:

said body portion has a spaced pair of opposite side edge portions extending between said opposite end edge portions, and said mounting pin structures are disposed generally intermediate said opposite side edge portions.

31. The computer apparatus of claim 30 wherein:

said mounting structure includes a pair of mounting walls extending transversely into the interior of said housing from adjacent said opposite end portions of said body portion, and said mounting socket structures are disposed on said mounting walls.

32. The computer apparatus of claim 31 wherein:

each of said mounting walls has first and second detent recesses formed therein and circumferentially spaced about said pivot axis, and said mounting pin structures have transverse, outwardly projecting detent portions receivable in said first and second detent recesses when said door member is respectively in said closed and open positions.

33. The computer apparatus of claim 32 wherein each of said mounting walls has a pair of stop surface portions circumferentially spaced around said pivot axis and serving as abutments engageable by said outwardly projecting detent portions in a manner limiting the pivotal movement of said door member to an arc extending between said closed and open positions.

34. Computer apparatus comprising:

a housing having a computer component therein, an exterior wall, and an opening formed in said exterior wall and providing access to said computer component;

a door member; and mounting structure supporting said door member for pivotal movement, about a pivot axis, relative to said exterior wall between a closed position in which said door member blocks said opening, and an open position in which said door member unblocks said access opening, said door member and said mounting structure having cooperatively engageable surfaces operative during pivotal movement of said door member toward one of said open and closed positions thereof to resiliently deform said door member and then permit the resiliently deformed door member to return to its original shape in a manner driving itself a final distance to said one of said open and closed positions thereof, said computer component being inwardly spaced apart from said opening, said door member being pivotable inwardly into said housing to said open position, and said door member being supported and configured in a manner such that during pivotal movement thereof to said open position said door member does not substantially encroach upon the space between said opening and said computer component.

* * * * *